Patented July 16, 1940

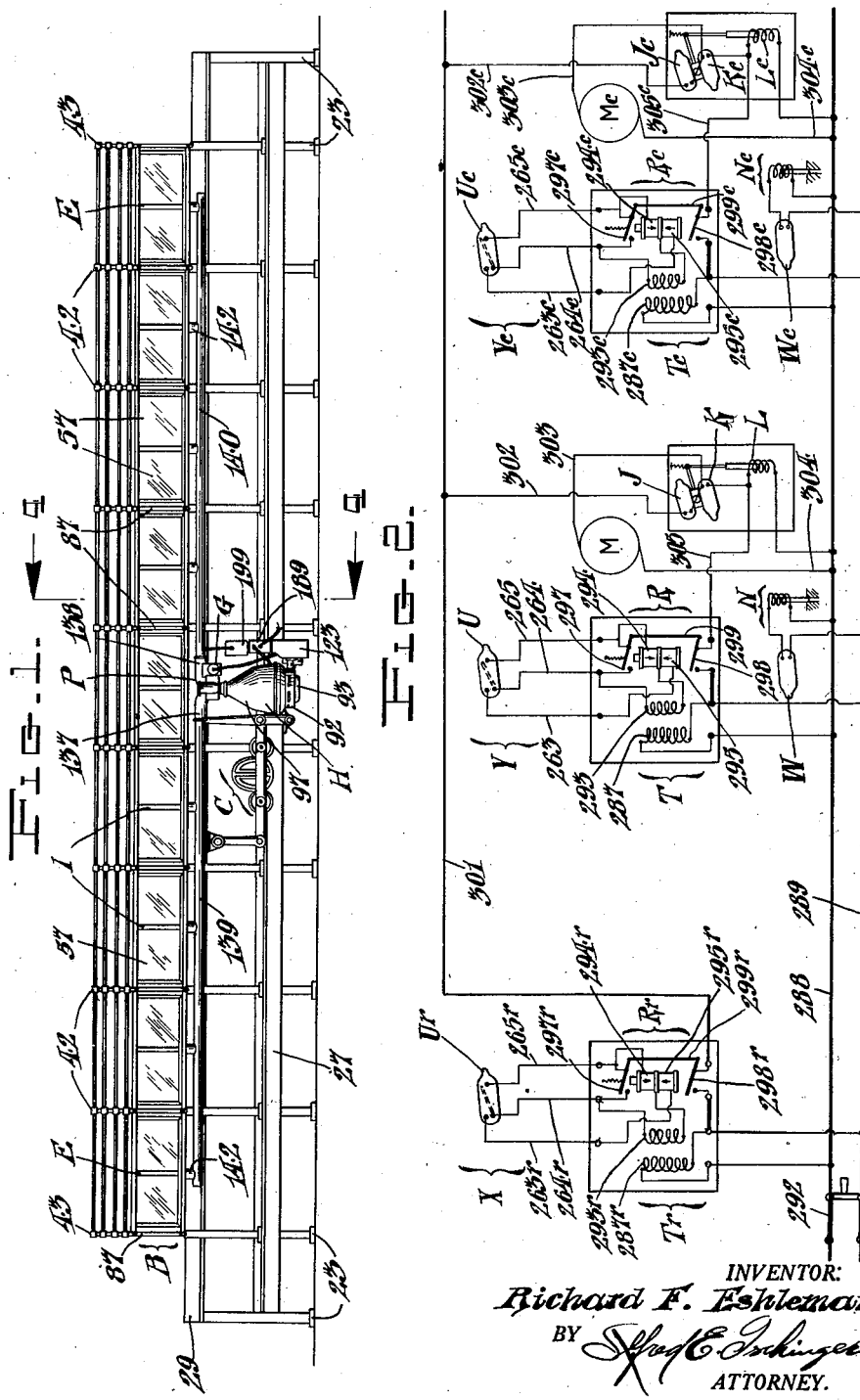

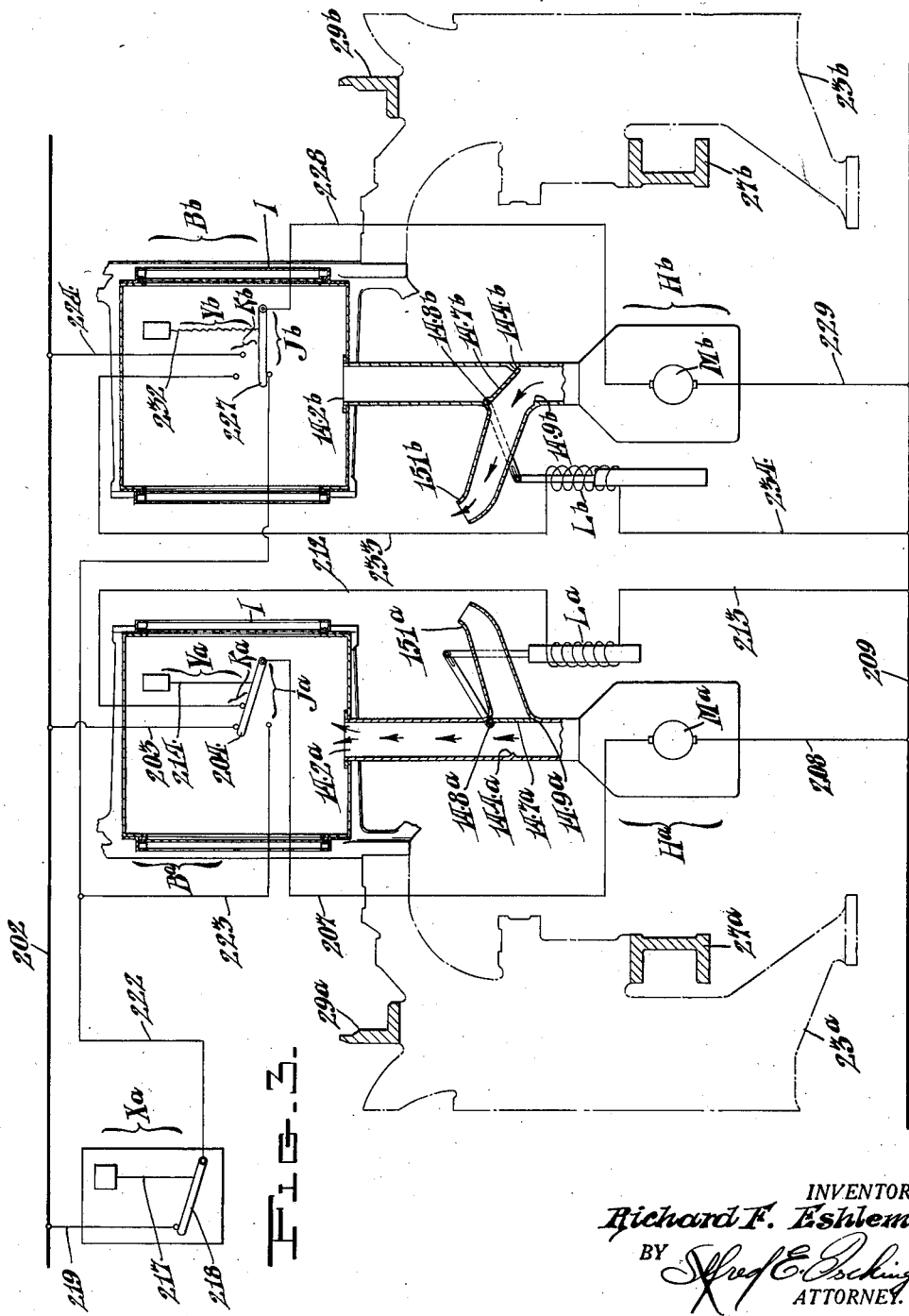

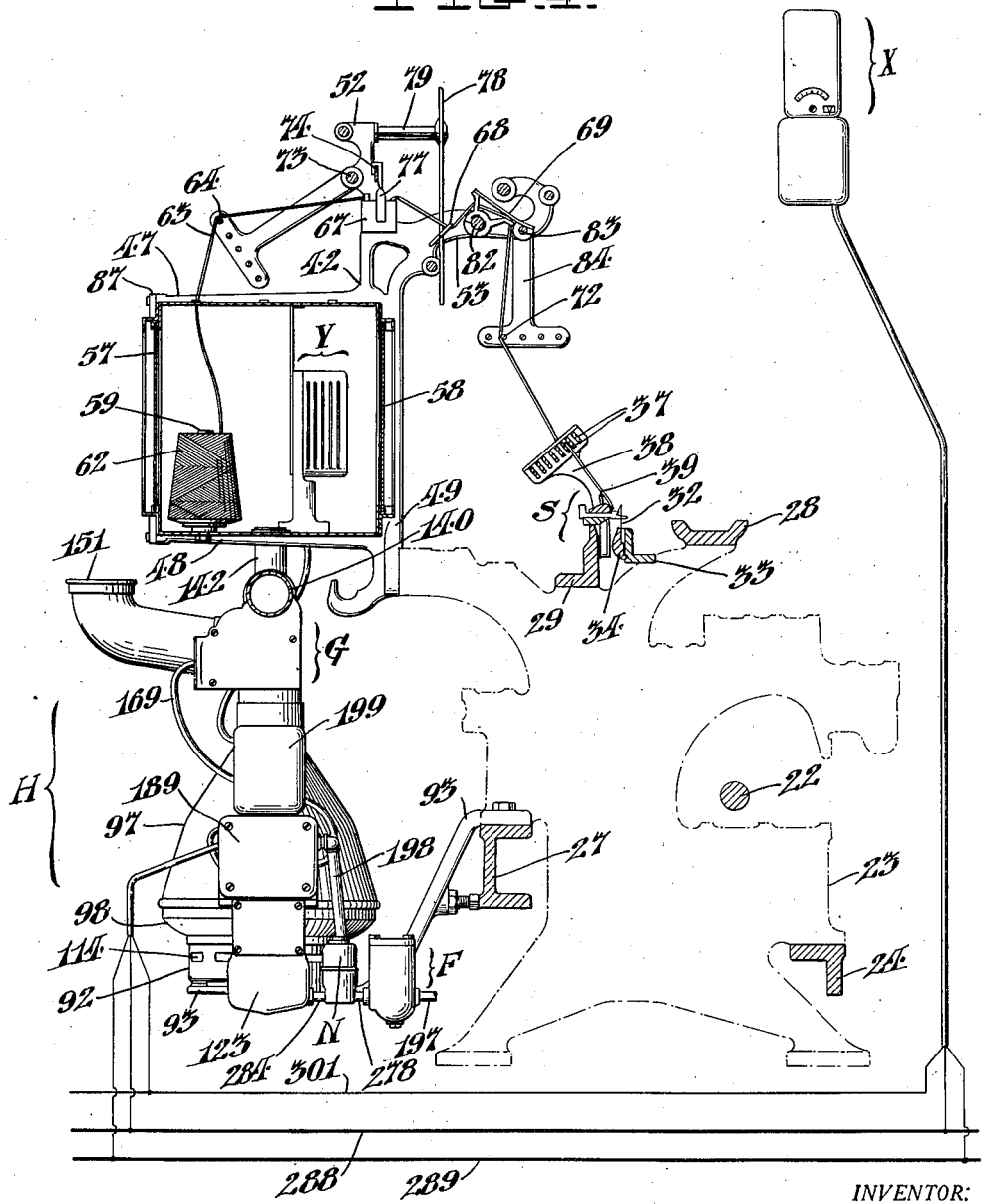

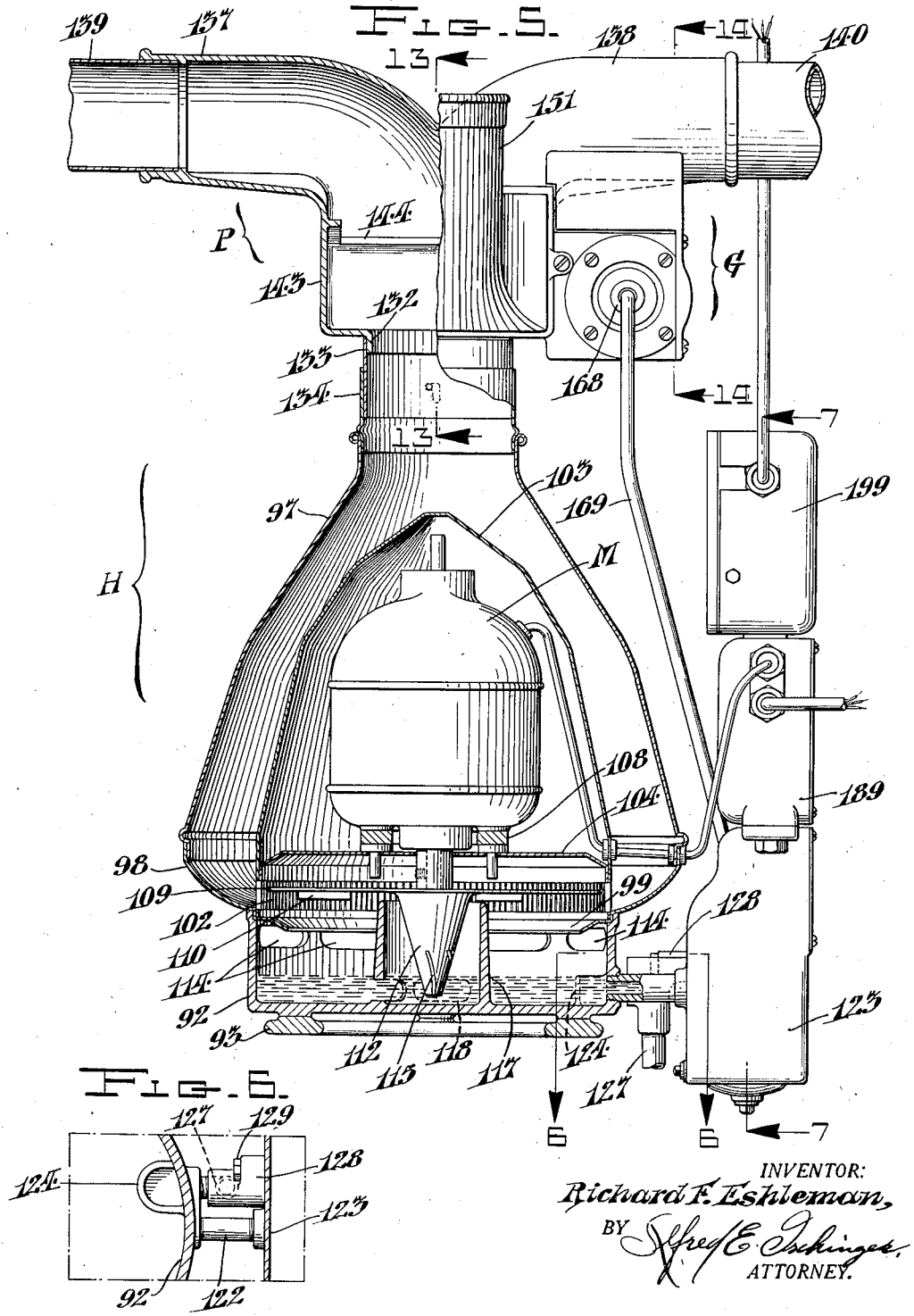

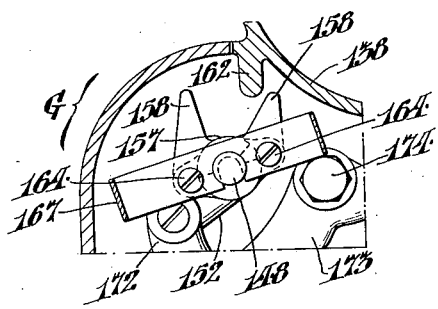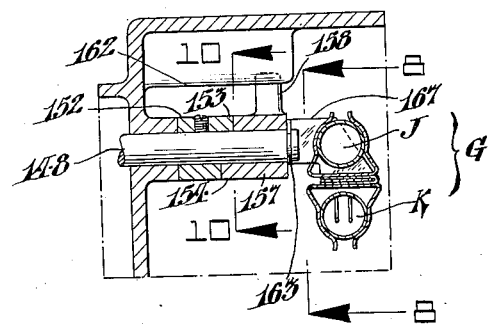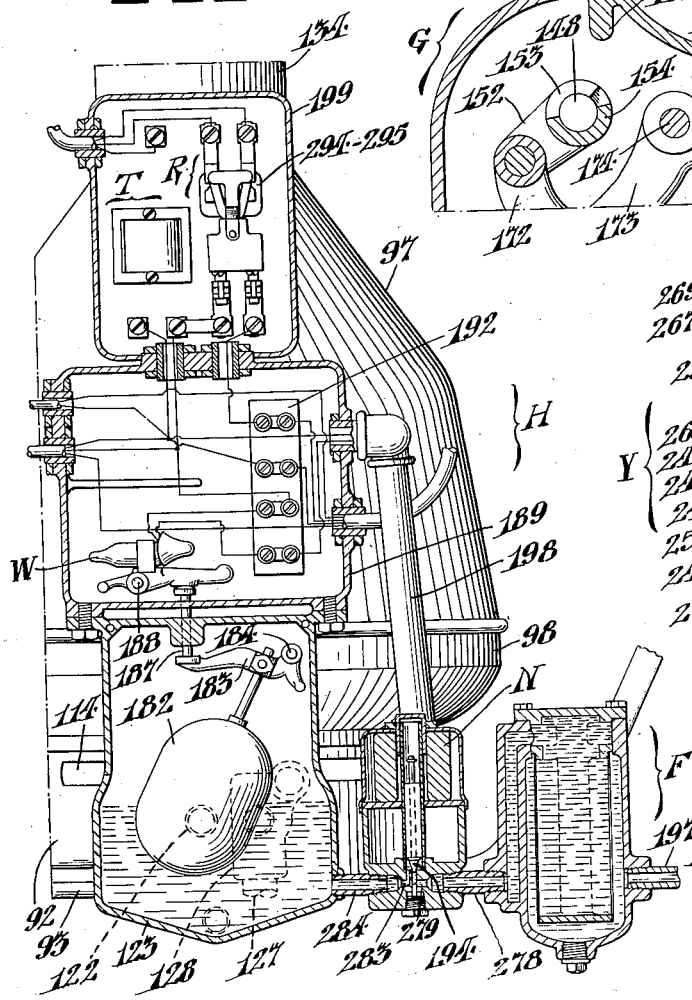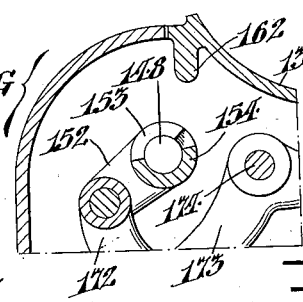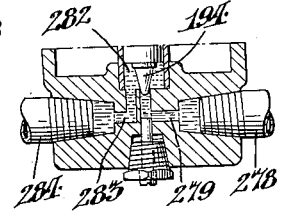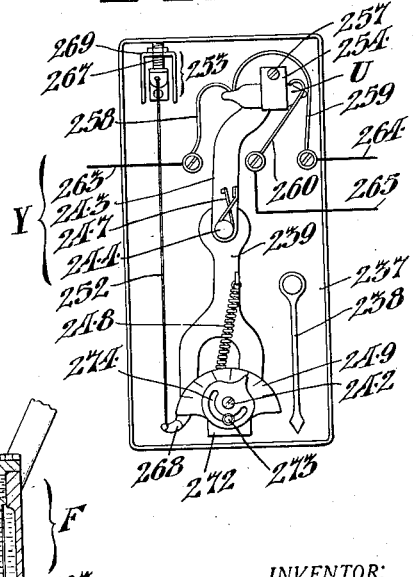

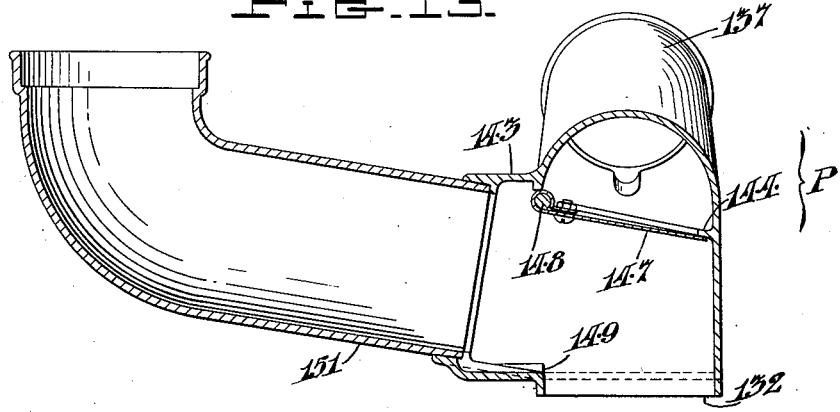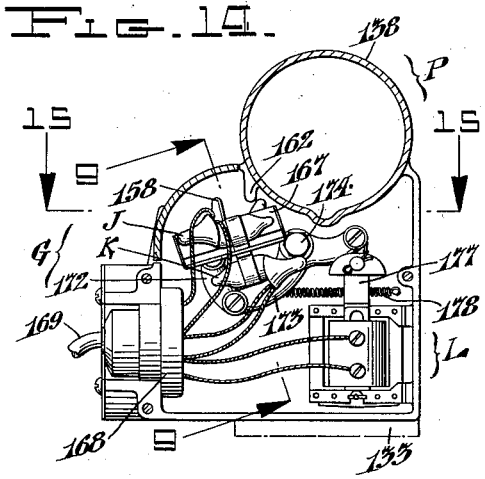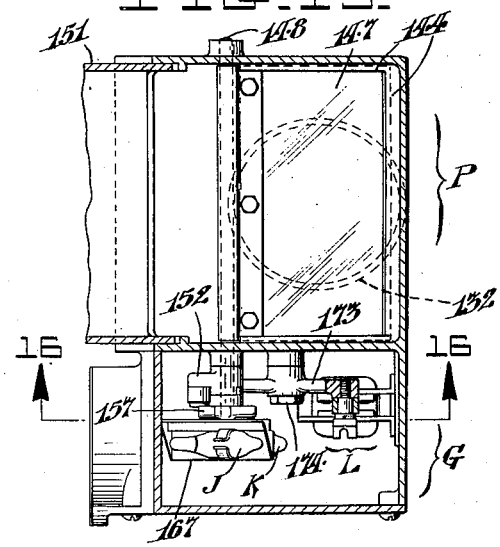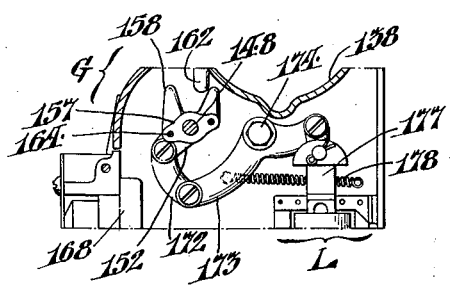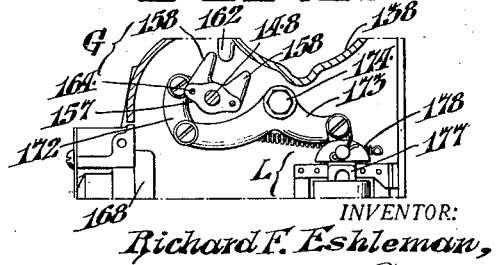

2,207,998

UNITED STATES PATENT OFFICE 2,207,998

SELECTIVE HUMIDIFICATION

Richard F. Eshleman, Shillington, Pa., assignor to Textile Machine Works, Wyomissing, Pa., a corporation of Pennsylvania Application April 2, 1937, Serial No. 134,506

22 Claims. (Cl. 66—125)

My invention relates to air conditioning methods and means, particularly for selectively conditioning a plurality of separate compartments or spaces, as for maintaining in good condition both the air in a yarn receptacle associated with a knitting machine, and the air in a room in which the machine is located.

In many applications, as in knitting articles such as fine silk hose, it has been usual to humidify to a certain extent both the rooms in which the machines are located and the yarns of the machines. That is, it has been usual to provide the machines with boxes or receptacles in which the yarn is subject to direct application of humid air by natural evaporation from pans of water in the boxes, and also to maintain the room at as nearly a given degree of humidity as possible. This was done to avoid crinkling of the yarn, and to have it assume effective shape and condition for manipulation by the needles and other loop-forming elements.

These devices operated such that yarn supplies at different parts of a multi-section machine, and at different parts of a room, in which the knitting was proceeding, were subject to different treatments. There followed the further result that fabrics, which were supposed to be alike, were of different characteristics, defects were of more frequent occurrence than with the device of my invention, and various other objections arose.

As set forth in Patent No. 2,066,781, issued January 5, 1937, to Henry Janssen, for the "Method of and means for effecting vapor treatment of yarn in a yarn fabricating machine," and assigned to the Textile Machine Works, Reading, Pennsylvania, assignee hereof, many of the above-mentioned objections were overcome by causing all of the yarns of a single machine, such as the many yarns in a multi-section machine, to be subjected to substantially identical treatment. It does this partially by the use of a mechanical vaporizer or humidifier unit whereby humid air can be produced in much greater quantity than previous devices in a given period of time, and partially by so uniting all of the several yarn receptacles of a multi-section machine into a single receptacle of several sections, as to provide for substantially complete homogenization of all the air in all the sections of the receptacle, together with means for automatically controlling the output of the humidifier in accordance with conditions in the receptacle, means for controlling the water-supply level of the humidifier, and by other elements making up the assembly.

It is one object of this invention to take advantage of the several valuable new features of the Janssen invention, and to provide further novel and useful features therefor, as will herein appear.

In knitting mills, as heretofore operated, as above stated, by having separate humidifying systems for the rooms on the one hand and the machines on the other, considerable expense was involved in having such double system, separate attention was required by each system and uniform distribution of the humid air in the rooms was not easily attained without considerable expense.

Another object of my invention is to so utilize the humidifying systems of the machines themselves, in conditioning the air of the rooms, as to aid the separate humidifying system of the rooms where their retention is desirable, and to do away with the necessity for them in other instances.

Thus, an entirely novel and useful aspect of the invention resides in the feature whereby a mill may be instituted without any humidifying system whatsoever, and the benefits thereof be supplied by the machines themselves when they arrive and are installed. In other words, the machines not only contain their own humidifying systems but also carry with them the means for humidifying the rooms in which they are to be disposed.

Another object of the invention is to provide a humidifying mechanism that is simple in construction and flexible in operation whereby to perform its duties with substantially maximum efficiency, minimum care and very little opportunity to get out of order.

A further object of the invention resides in operating a plurality of the machines in one room whereby the machines may operate simultaneously or independently of each other in accordance with different humidity conditions in different machines or different humidity conditions in different parts of the room, so that a better average, or more even distribution of, humidity in both the room and the yarn receptacles of the several machines may be obtained than with any machine or room system of humidification of which I am aware.

With these and other objects in view, which will become apparent from the following detailed description of the illustrative embodiment of the invention shown in the accompanying drawings, my invention resides in the novel method or system, elements, features of construction and arrangement of parts in cooperative relation, as hereinafter more particularly pointed out in the claims.

In the drawings:

Figure 1 is an outline view, in rear elevation, of a multi-section full-fashioned knitting machine embodying a device of the invention for humidifying both the yarns of the machine in a receptacle locally associated with the machine, and the room in which the machine is located;

Fig. 2 is a diagram of the electrical elements and circuits associated with the invention;

Fig. 3 is a diagram of a simplified form of the invention from which a clearer understanding may be had of the form shown in the other figures;

Fig. 4 is an enlarged transverse vertical sectional view of the knitting machine embodying the invention, taken substantially along the line 4—4 of Fig. 1, a frame of the machine being shown in dot-and-dash lines, and a diagram of electrical circuits being included;

Fig. 5 is a view, on a greatly enlarged scale, of a humidifier unit as viewed at the center of Fig. 1, but with certain parts broken away and others in section;

Fig. 6 is a detail view, taken substantially along the line 6—6 of Fig. 5;

Fig. 7 is a sectional view, taken along the line 7—7 of Fig. 5 indicating certain electrical wiring diagrammatically;

Fig. 8 is a sectional view taken along the line 8—8 of Fig. 9;

Fig. 9 is a sectional view taken along the line 9—9 of Fig. 14;

Fig. 10 is a sectional view taken along the line 10—10 of Fig. 9;

Fig. 11 is an enlarged detail view of a valve portion of the device as seen at the lower portion of Fig. 7;

Fig. 12 is a view of a humidostat employed in the structure, the cover being removed;

Fig. 13 is a sectional view, taken along the line 13—13 of Fig. 5;

Fig. 14 is a sectional view taken along the line 14—14 of Fig. 5;

Fig. 15 is a sectional view, taken along the line 15—15 of Fig. 14;

Fig. 16 is a sectional view taken along the line 16—16 of Fig. 15; and

Fig. 17 is a view, similar to Fig. 16, showing the parts thereof in different operative position.

In practicing the method of the invention, which comprises the supplying, as from a common source, of humid air to different compartments or spaces, such as the space in the yarn receptacle associated with a machine and the space of the room in which the machine is located, control or humidostat means is provided in the yarn receptacle whereby a mechanical vaporizer unit supplies humid air to the receptacle in accordance with a given condition, such as the demand of the yarn in the receptacle, this feature being similar to the operation of the Janssen invention above set forth in which the humid air traverses passageway means from the mechanical humidifier unit to the receptacle.

However, in accordance with my improvement, there are provided, in addition to the equipment of the Janssen patent, a humidostat in the room in which the machine is housed, a by-pass in the above-mentioned passageway between the humidifier unit and the yarn receptacle, a valve or gate for the by-pass, and means for actuating the gate that is so controlled by both the humidostat in the room and the humidostat in the yarn receptacle as to supply the receptacle with humid air the same as though the improvement were not added, but which, after the demands of the apparatus, as invented by Janssen, are satisfied, will supply humid air to the room.

Thus, since in the apparatus before my improvement, there are periods of time of substantial duration in which the vaporizer unit is resting, or inactive, this unit is utilized during all or portions of such periods to humidify the air of the room, without interfering in any way with its advantages of operation in accordance with the Janssen invention. Thus, even though the improvement is effective only during the periods when the humidifier is not supplying conditioned air to the yarn receptacle, it is not necessarily at work during all of these periods. The device is 20 absolutely flexible, is effective to humidify the room, and is not necessarily required to operate all the time that it is not supplying humid air to the receptacle.

Referring to the drawings, means for practicing the method of the invention is shown as applied to a "Reading" full fashioned knitting machine, only the parts of which, necessary to a complete understanding of the invention are shown, the other parts and the operation thereof being well known, as fully shown and described in the "Reading" Full Fashioned Knitting Machine Catalogue, copyright 1935 and published by the Textile Machine Works, Reading, Pa.

Referring to Figs. 1 and 4, a multi-section full fashioned knitting machine, given by way of example, comprises a cam shaft 22 rotatably journaled in bearings on end and center frames 23 which are held in spaced relation to each other along the machine by a front beam 24, a back beam 27, a front bed 28 and a center bed 29.

Banks of needles, only one bank 32 of which is indicated in Fig. 4, are each held to a needle bar 33 by a clamp 34 and cooperate in a usual manner with the sinkers, dividers and knockover bits of a sinker head assembly S mounted on the center bed 29. Carrier bars 37, longitudinally reciprocably mounted on brackets 38 on the center bed 29 support yarn carriers, like the carrier 39, to lay yarn to the needles and sinker head assembly for formation into courses of loops.

A coulier motion mechanism C, Fig. 1, is provided at the rear of the machine for actuating the knitting mechanism, all of the parts above set forth being as heretofore employed in the above-mentioned "Reading" machine.

Among the parts as added or modified by the above-mentioned Janssen invention, a plurality of intermediate brackets 42 and end brackets 43 are secured to the frames 23 for supporting a multi-section yarn-moistening receptacle unit B.

The end and intermediate brackets 42 and 43 each have body portions which are of substantially C-shape having upper and lower horizontal arms 47 and 48, respectively, Fig. 4, and a vertical portion 49 for direct attachment to the frame 23 and upper portions 52 and 53.

The receptacle unit B comprises intermediate sections I and end sections E disposed end-to-end making up an elongated structure of rectangular cross section, the sections I each being open at each end and the end sections E each being open at its inner end, next to the adjacent section I, and closed at its outer end, constituting one end of the unit.

All of the sections I and E are constructed, as of galvanized sheet metal, and have sliding front and rear glass-paneled doors 57 and 58, respectively. Bobbin-supporting pins, such as the pin 59 of Fig. 4, supported on the bottom walls of the receptacle unit sections, are provided to support yarn packages or cones, such as the cone 62 each of which supplies yarn 63 through an eyelet in the top wall of the receptacle unit, over a guide rod 64, through a moistening trough 67, through a tension ring 68, through a snapper 69, past and against a guide rod 72 and along the carrier 39 to the sinker head assembly S and the needles 32.

The guide rod 64 is mounted on an arm of substantially T-shape secured to the bracket portion 52, as by a pin 73 near the moistening trough 67 which is also mounted on the brackets 42—43 by a bar 74 and suspension elements 77 in the form of hooks. The tension ring 68 is loosely vertically movably mounted about an upright member 78 that is secured to the bracket portion 52 by a stud 79. The snapper 69 is pivotally mounted, by a shaft 82, on the bracket portion 53 which also supports, by a pin 83, another arm 84 of substantially T-shape on which the guide rod 72 is mounted.

The sections of the receptacle unit B fit relatively closely between the upper, lower and rear vertical arms of the brackets 42 and 43, against the vertical arms of which they are secured by upright clamp bars 87. The inner faces of the arms of the intermediate brackets 42 fitting against three sides of the receptacle are flat, whereas the corresponding faces of the end brackets 43 are of rabbet groove character to hold the receptacle longitudinally. The adjacent open ends of all the receptacle sections have vertical perimetral flanges in abutting relation to each other to provide a seal and to lend rigidity; the vertical joint between each pair of sections being covered by the adjacent bracket arms and clamp 87.

By removing the clamp bars 87 from the brackets 42 and 43, the receptacle unit, or individual sections thereof, can be slidably removed therefrom.

A mechanical humidifying or vaporous-medium producing unit H, disposed at the rear of the machine near the coulier motion mechanism C, see Figs. 1, 4, 5 and 7, includes a base well 92 supported on the back beam 27 by a bracket 93, an outer shell including upper and lower elements 97 and 98, respectively, a flange or ring element 99, a grid 102, a dome 103, a partition 104, a motor M mounted on a support 108, and a rotary element supported at the lower end of the motor shaft comprising a disc 109, and fan blades 110 and a cone 112 at the underside of the disc having helical water-lifting propeller portions 115.

The well 92 has outer wall apertures 114 through which air is drawn by the fan blades 110, a central cylindrical compartment 117 connecting with the main body of the well through apertures 118 and adapted to prevent throwing of water through the apertures 114 by the cone 112. An inlet port conduit 122, see Fig. 6, extends from a float chamber housing 123, and an overflow well 124 connects with an outlet or drain conduit 127 forming part of a bracket 128 secured to the float housing 123 by a screw 129.

A structure P of T-connector conduit character has a perpendicular leg 132 telescopically fitted to the top of the upper humidifier casing element 97 by sleeves 133 and 134, and oppositely extending substantially horizontal arms 137 and 138 connected to conduit sections 139 and 140, respectively, extending along the underside of the receptacle unit B and connected thereto at intervals by nozzles 142.

When the motor M is energized, the cone 112, rotating at high speed, draws water upwardly therealong to the bottom of the disc 109 which radially spreads and impels the water forcibly against and through the grid 102. This action, in combination with the action of the fan blades 110 in drawing air inwardly through the apertures 114 and expelling it radially outwardly of the disc 109 with the water through the grid 102, reduces or breaks up the water into a completely vaporized medium which is impelled upwardly, in the space between the shell elements 97 and 98 at one side and the dome 103 at the other side, to the connector P for continued travel either to the receptacle unit B through the arms 137 and 138, and the conduits 139 and 140, or to the room through a nozzle 151.

A portion 143 of the perpendicular leg 132 of the connector P of box-like character encloses a valve-seat flange 144 for a valve gate 147 that is pivotally journaled on a shaft 148 for moving the gate from position against the flange 144, as shown in Fig. 13, in which the vapor is shut off from the receptacle unit B, and a position against another valve-gate seat 149, in which position vapor from the humidifier H is shut off from the nozzle 151 leading to the atmosphere of the room in which the machine is disposed. As shown in Figs. 8, 9, 10, 15, 16 and 17, the valve gate shaft 148 extends into a housing or compartment G that is secured to one side of the box-like portion 143 of the connector P. Fixed to the shaft 148 in the compartment G, is a lever arm 152 having a clutch face 153 for cooperation with a clutch face 154 of an element 157, the latter mounted to swivel on shaft 148 and having arms 158 for alternate engagement with a stop portion 162 of the T-connector conduit arm 138 in the housing G.

The shaft 148 has a peripheral groove 163 near its end in the housing G whereby a strap metal bracket 167 having a side slot for such purpose may be centered thereon and secured to the element 157 as by screws 164. The bracket 167 carries mercury tube switches J and K connected to flexible leads extending through a bushing 168 and a conduit 169.

The arm 152 is connected by a link 172 to one end of a lever 173 that is pivotally mounted at an intermediate portion in the housing G by a pin 174 and is pivotally connected at its other end to a plunger 177 of a solenoid L that is secured to the housing G and is also connected to conducting leads extending through the bushing 168 and the conduit 169.

The positions of the parts, as shown in Figs. 8, 9, 10, 13, 14, 15 and 16, correspond to the deenergized condition of the solenoid L, the open position of the switch K and the position of the gate 147 preventing the flow of vapor to the receptacle unit B and permitting it to flow to the room. The switch, solenoid and valve gate parts are biased toward the above-mentioned positions by a tension spring 178 connected between the lever 173 and a pin fixed in position in the housing G.

When the solenoid L is energized, it moves the lever 173 and the arm 152 clockwise about the axes thereof, as viewed in Figs. 8, 10, 14 and 15 to the position of Fig. 17, in doing which, after a certain degree of clockwise movement, a shoulder on the clutch face 153 engages a shoulder on the clutch face 154 to tilt the mercury tube switches J and K a distance less than the angle of movement required to move the valve gate 147 from its position against the flange 144, as seen in Fig. 13. In the reverse movement, caused by deenergization of the solenoid L, the lever 173 also moves a shoulder on the clutch face 153 to engage a shoulder on the clutch face 154 to oppositely tilt the switches J and K. In these actions, the arms 158 prevent overthrow of the switches J and K from the impulses imparted thereto by the solenoid L.

A float 182, in the housing 123, is fixed to a lever 183 pivotally mounted on a pin 184 and engages an upright plunger 187 for operating a mercury tube switch W that is pivoted on a pin 188 in a cabinet 189 containing a terminal board 192 for various electrical connections and circuits.

The float 182 controls the circuit of a solenoid N which controls a needle valve 194, as better shown in Fig. 11, to regulate the time and amount of water admitted to the well 92 from a supply pipe 197 through a filter unit F. Electrical connections between the solenoid N and the terminal board 192 are contained in a conduit 198.

Referring more particularly to Figs. 5, 7 and 11, the level of the water in the float chamber housing 123, is maintained substantially constant by the float 182 which, when the water falls below a predetermined level moves counter-clockwise as viewed in Fig. 7, to cause clockwise movement of the mercury tube switch W about its pivot pin 188. This action energizes the solenoid N to lift the needle valve 194 whereby water passes from the supply pipe 197, through the filter F, through a nipple 278, see Fig. 11, into a passageway 279, upwardly into a small chamber 282, downwardly from the chamber 282 through a passage 283 and through another nipple 284 into the chamber 123.

A switch or relay R, operated through a transformer T in a housing 199, controls the circuit of the motor M in accordance with operation of a humidostat X (Fig. 2) in the room in which the machine is located, as determined by the condition of a humidostat Y in the receptacle unit B. If more than one knitting machine is operated in a battery with the machine herein generally shown, as indicated by a second motor Mc thereof, the latter is likewise controlled by a relay Rc, the room humidostat X, and by a humidostat Yc in a second receptacle unit like the unit B.

For a clearer understanding of the operation of the device so far described, attention is first directed to the modified form of the invention of Fig. 3 in which, although the parts do not correspond exactly to those of the other figures, such as in the substitution of mechanical switches for mercury switches, and direct current for alternating current, the operation and results are substantially the same, except in details of the electrical circuits not affecting the principles of the invention.

In Fig. 3, parts corresponding, or substantially corresponding, to parts of the other figures are designated by corresponding reference characters distinguished by the suffices a and b. Thus, the room humidostat is designated Xa, a first receptacle unit Ba, a second receptacle unit Bb, a first humidifer Ha, a second humidifier Hb, a first receptacle humidostat Ya, a second receptacle humidostat Yb, and so on, with parts of the two knitting machines of Fig. 3 similarly designated.

Although the invention is adapted to operate in connection with a single machine, its operation with a battery of machines is illustrated in Fig. 2, and also in Fig. 3, as will hereinafter be described.

In Fig. 3, two knitting machines are indicated in transverse outline, one at the right and one at the left of the figure in back-to-back relation, as viewed along an aisle between them.

A motor Ma of the left hand machine is indicated as being supplied with current directly from a main-line supply conductor 202, through a conductor 203, a switch arm 204, a conductor 207 and a conductor 208 to a main ground line conductor 209. At the same time, a solenoid La is also supplied with current directly from the main line conductor 203, through the switch arm 204, a conductor 212, and a conductor 213 to the main ground line conductor 209.

In this position of the parts, the motor Ma is operating to supply vapor from the humidifier Ha, and the solenoid La is energized to shut off passage of vapor through the nozzle 151a to the room, and to admit the vapor to the receptacle Ba in which, prior to the above condition an animal hair 214 of the humidostat Ya, becoming too dry, had contracted to close the switch arm 204 against stationary contact members of the conductors 203 and 212.

Note also, that at the above stage of operation of the left-hand machine, an animal hair 217 of the room humidostat Xa is also dry enough to move a switch arm 218 to closed circuit position, but this fact does not affect the left hand machine, since a by-pass circuit for the motor Ma, from the main line conductor 202, a conductor 219, a conductor 222, a conductor 223, the switch arm 204, the conductor 207 and the conductor 208, is open at the switch blade 204.

However, at the right hand machine, conditions are reversed, the motor Mb is not getting current directly from the main line conductor 202, a conductor 224, a switch arm 227, a conductor 228 and a conductor 229, because an animal hair 232 of the humidostat Yb is sufficiently wet to cause elongation of the hair which in turn opens the circuit of the conductors 224 and 228. However, the motor is getting current from the main line conductor 202, through the conductor 219, the switch arm 218, the conductor 222, the switch arm 227, the conductor 228, the conductor 229, and the main ground line 209. At the same time, the only way for the solenoid Lb to become energized from the main line conductor 202, the conductor 224, a conductor 233 and a conductor 234 to the ground line conductor 209, is open at the switch blade 227, so that, with the solenoid Lb deenergized, and the motor Mb working, the valve gate 147b closes off the vapor to the receptacle Bb and allows it to pass through the nozzle 151b to the room atmosphere.

Thus, irrespective of whether the switch arm 218 of the room humidostat Xa is in open or closed position, either of the receptacle units Ba or Bb can obtain vapor from its associated humidifier, and the room can only get the vapor from either machine when the machine itself does not require it. Thus, also, the machines, of which there are any desired number, can operate simultaneously or independently.

Referring to Fig. 2, the humidostat Y, also illustrated in Fig. 4, is constructed as shown in further detail in Fig. 12 in which a panel or base 231 supports a pendulum 238 to determine the level of the instrument, a main actuating arm 239 pivoted on a shaft 242 at the lower part of the device, an auxiliary arm 243 pivoted to the main arm 239 by a pintle 244, a spring 247, a spring 248, an adjusting sector 249, a moisture-extensive filament 252, an adjusting terminal 253 for the filament 252, an arm 254 pivoted on a pin 257 for carrying a mercury tube switch U, and flexible leads 258, 259 and 260 between the tube U and stationary terminals or binding posts on the panel 237 for connection to conductors 263, 264 and 265, respectively. In Fig. 2, the only parts of the humidostat Y shown are the tube U and the conductors 263, 264 and 265.

The moisture-extensive filament 252 is constituted of human hair suspended between a stud 267 of the terminal 253 and the lower end 268 of the main actuating arm 239. By adjusting the stud 267 in its stationary supporting bracket 269 the filament may be conditioned to operate the switch U at any of several values of humidity. The pintle 244 and the auxiliary arm 243 move in unison with the main arm 239 in an arc about the lower pin 242; the arm 243 being loosely connected, as by a fork, to the lever 254 whereby to actuate the latter a certain distance to make and break the circuits in the tube U irrespective of variable throw of the arm 239. The spring 247 constitutes a yielding connection between the arms 239 and 243 whereby to compensate for the variable throw of the arm 239. The spring 248 connected between the arm 239 and a stationary bracket 272 behind the sector 249, biases the arm 239 counterclockwise about its pivot pin 242, as viewed in the figure, whereby to open the circuit of the tube U between the conductors 263 and 264 and to close the circuit between the conductors 264 and 265 when the hair 252 becomes too wet for the degree of humidity desired to be maintained. By adjusting the sector 249 about the axis of the shaft 242 and setting it with a screw 273 in an arcuate slot 274 of the sector, the device can be caused to open and close the above-mentioned circuits of the tube U at any desired value of humidity.

As indicated in Fig. 2, the transformer T of Fig. 7, has a primary winding 287 connected across main supply-line conductors 288 and 289 from a source of electromotive force (not shown) but extending to the conductors 288 and 289 through a master switch 292 from the left, as viewed in the drawings. The conductors 288 and 289 extend to the right from the switch 292 to any desired number of machines, only two of which, associated with the humidostats Y and Yc, are represented.

A secondary winding 293 of the transformer T is connected at one end to the conductor 264 of the humidostat Y and, at the other end at a point between two coils 294 and 295 of the solenoid R. The other end of the coil 294 is connected to the conductor 265, and the other end of the coil 295 is connected to the conductor 263 of the humidostat Y. The solenoid R operates switches 297 and 298 connected by a link 299 which opens the switches simultaneously and closes them simultaneously.

The coils 294 and 295, when individually energized, operate oppositely, respectively, on the link 299. When the switch 297 is closed, it short circuits the contacts at the ends of the conductors 264 and 265 in the tube U, and creates a new energizing circuit for the coil 294 through the secondary winding 293. With the switch 297 thus closed, when the tube U is moved to the position of Fig. 2, to close the circuit between the conductors 263 and 264, current through the coil 295 causes the magnetism thereof to instantaneously buck the magnetism of the coil 294, whereby the switch 297 is opened by a spring.

The humidostats X and Yc, indicated in Fig. 2, are constructed similarly to the humidostat Y as above described, corresponding parts in Fig. 2, being designated by corresponding reference characters distinguished by the suffix r associated with the room humidostat X, and the suffix c associated with the humidostat Yc of a second machine like the machine above described. From one terminal of the switch 298r of the humidostat X, a conductor 301, similar to the conductor 222 of Fig. 3, extends, and is common, to all the machines.

When there is enough humidity in both the room and the receptacle units, the parts and circuits are conditioned as in Fig. 2, in which the primary circuits of the transformers T, Tc and Tr are energized. Under this condition, the secondary transformer circuits also are closed at each humidostat, as in the humidostat X, in which a circuit is completed from the tube Ur, through the conductor 263r, the solenoid coil 295r, the secondary winding 293r and the conductor 264r. This condition positively holds the switches 297r and 298r open. All of the corresponding parts and circuits of the other humidostats Y and Yc are conditioned the same way, with the humidifier motors idle and no vapor being produced.

Assuming that the yarn-receptacle units of the humidostats Y and Yc remain sufficiently humid to maintain the above-mentioned conditions, and that the humidity of the room drops, the tube Ur will be tilted clockwise, as viewed in Fig. 2, which action opens the circuit between the conductors 263r and 264r and closes the circuit between the conductors 264r and 265r, which circuit, being through the relay coil 294r, is thereby energized instantaneously to close switches 297r and 298r. When the switches are closed, the circuit between the conductors 264r and 265r and through secondary winding 293r and the coil 294r, is closed by the switch 297r so that an open circuit in the tube Ur between the conductors 264r and 265r caused by vibration or any other cause in the tube Ur will have no effect, since the latter is short circuited by the switch 297r.

Closing of the switch 298r connects the conductor 301 to one side 289 of the main supply line whereby the motors M and Mc are started. The motor M is energized from the conductor 301 through a conductor 302, the tube J, a conductor 303 and a conductor 304 to the opposite main line conductor 288. Likewise the motor Mc is simultaneously energized through the correspondingly designated parts. This action operates the motors M and Mc to cause the corresponding humidifying units of the respective machines to give off humidity to the room atmosphere.

Reverting to the initial condition referred to above, and indicated by the position of parts and circuits in Fig. 2, and assuming that the receptacle unit B of the machine having the humidostat Y gets too dry, while the room humidity affecting the humidostat X remains sufficiently wet to retain the tube Ur as shown, this condition will cause the humidostat Y to tilt the tube U clockwise as viewed in Fig. 2. This action opens the circuit between the conductors 263 and 264 and closes the circuit between the conductors 264 and 265 through the secondary winding 293 and the coil 294 to cause actions like those described above as to humidostat X whereby a circuit is established from the main supply conductor 289, the switch 298, a conductor 305 and the solenoid L to the opposite main supply line conductor 288. This action tilts the tubes J and K clockwise as viewed in Fig. 2, whereupon a circuit is established from the conductor 305, through the tube K, the conductor 303, the motor M and the conductor 304 to the opposite line conductor 288. At the same time, with the tubes J and K thus tilted, the circuit from the common line conductor 301 is broken in the tube J so that no matter what the room humidostat X does it cannot affect the motor M or cause the humidifier of the latter to give off humidity to the room until the receptacle unit B has become sufficiently humidified, at which time, the tubes J and K will be tilted counterclockwise and the circuit through the motor M from the conductor 301 to the conductor 288 will be reestablished for the humidostat X in case the latter needs it.

Thus, as in the form of Fig. 3, the invention is effective to operate the motors M and Mc of Fig. 2 separately or simultaneously to supply vapor to the corresponding receptacle units and, when not doing this, to separately or simultaneously supply vapor to the room.

As indicated also in Fig. 2, the float operated mercury vapor tube W is in constant readiness to close a circuit through the solenoid N when the tube is tilted clockwise by lowered water level in the chamber structure 123 as seen in Fig. 7.

Of course, the improvements specifically shown and described, by which the above-mentioned results are obtained, may be changed and modified in various ways without departing from the invention as set forth and claimed.

I claim:

1. Means for humidifying the interior of an enclosure receptacle and the space outside the receptacle encompassed by the walls of a room in which the receptacle is disposed, comprising a humidifier unit, passageway means for transmitting humid air from the unit to the spaces enclosed by the receptacle and the room, and means for automatically controlling said transmission in accordance with the humidities in said spaces to cause said unit to act principally on one of said spaces to produce first a desired degree of humidity in one of said spaces and thereafter to substantially reduce the action of said unit with respect to said one space and to bring up the humidity in the other of said spaces to a desired degree.

2. A structure assembly for position in a room and embodying an enclosure receptacle, and means for humidifying the space outside the receptacle encompassed by the room walls and the space encompassed by the receptacle comprising a humidifier unit constituting part of said assembly, passageway means for transmitting humid air from the unit to the interior of the receptacle and into the room, and means for automatically controlling said transmission in accordance with the humidities in said spaces to produce first a desired degree of humidity in said receptacle and thereafter to bring up the humidity of the space outside the receptacle to a desired degree without materially increasing the humidity within the receptacle.

3. The method of humidification which comprises employing in a room a structure embodying an enclosure receptacle and a humidifier unit for supplying humid air to the interior of its receptacle, utilizing the unit to supply humid air to the interior of the room, and automatically controlling the unit to supply the humid air to the room when the space in the receptacle is humidified to a predetermined degree, and stopping the unit or utilizing it to again supply humid air to the receptacle when the space in the room is humidified to a predetermined degree depending on whether the humidity in the space in the receptacle has dropped below the degree predetermined therefor.

4. The method of humidification which comprises employing in a room a plurality of structures each embodying an enclosure receptacle and a humidifier unit for supplying humid air to the interior of its receptacle, said structure utilizing the respective units to severally and simultaneously supply humid air to the room, and automatically controlling said units to supply the humid air in the room when the spaces in the respective receptacles are severally or simultaneously humidified to a predetermined degree until the degree of humidity in the space in the room has reached a predetermined degree and then stopping the units unless the degree of humidity in one or more of the receptacles has first dropped below the degree predetermined therefor and in the latter case immediately utilizing the units to again bring the degree of humidity in the receptacles to the predetermined degree.

5. Means for humidifying a plurality of enclosed spaces subject to different humidity conditions, comprising a humidifier unit, passageway means for transmitting humid air to said spaces, and humidostat means disposed in the respective spaces and operable in accordance with the humidity of the respective spaces for selectively controlling the passage of air through said passageway means to said spaces, one of said humidostat means being ineffective to cause flow of humid air to its space irrespective of the degree of humidity of its space and that of another space until the air in said other space attains a predetermined humidity value.

6. Means for humidifying a yarn receptacle and a room in which the receptacle is disposed, comprising a humidifier unit, a passageway element extending from the unit to the receptacle having a by-pass to the room, a gate for the by-pass, a humidostat in the receptacle for controlling the unit and the gate to supply humid air to the receptacle at all times required by the receptacle, and a humidostat in the room outside the receptacle for controlling the unit and the gate to supply humid air to the room when needed by the room and not needed by the receptacle.

7. The combination with a knitting machine, and a receptacle associated with the machine for treating yarn to be fed directly from the receptacle to the machine, of means for humidifying the receptacle interior and the room in which the machine is located, comprising a humidifier unit, a passageway element from the unit to the receptacle having a by-pass to the room, a gate for the by-pass, a humidostat in the receptacle for controlling the unit and the gate to supply humid air to the receptacle at all times required by the receptacle, and a humidostat in the room outside the receptacle for controlling the unit and the gate to supply humid air to the room when needed by the room and not needed by the receptacle.

8. The combination with a knitting machine, and a receptacle associated with the machine for treating yarn to be fed directly from the receptacle to the machine, of means for humidifying the receptacle interior and the room in which the machine is located, comprising a humidifier unit associated with the machine, passageway means for conducting humid air from the unit to the receptacle and from the unit to the room without passing through the receptacle, and means including humidostat means for controlling the operation of said humidifier unit to first bring up the humidity in said receptacle to a desired degree and thereafter to bring up the humidity in the room in which the machine is located to a desired degree without materially increasing the humidity within said receptacle.

9. In combination, a plurality of knitting machines, a yarn receptacle associated with each thereof, and a humidifier unit for supplying humid air to the receptacle and to the room in which the machines are located, and means for controlling the operation of said units including a humidostat common to all of said humidifier units.

10. In combination, a plurality of knitting machines, a yarn receptacle associated with each thereof, a humidifier unit for each machine supplying humid air to the associated receptacle, and means for each machine including a humidostat for controlling the operation of the associated humidifier unit, and means for controlling the operation of said units including another humidostat common to all of said units.

11. The combination with a multi-section knitting machine, a multi-section yarn-receptacle unit for containing all the yarns of all the machine sections, and means for humidifying the air in said unit including a humidifier device, passageway means between said device and the receptacle unit, and means including a humidostat tending to render said device active in the unit tending to render said device active and inactive when the humidity of the interior of the unit is below and above a predetermined degree of humidity, respectively, of a by-pass portion of said passageway means and a gate at the by-pass operative to direct humid air from the humidifier either to the interior of said receptacle unit or to the room outside the receptacle in which the machine is disposed, and means including a humidostat in the room outside the receptacle tending to render said humidifier device active when the humidity of the room is below a predetermined value but only when the humidity in the receptacle is above its said predetermined degree.

12. The combination with a multi-section knitting machine, a multi-section yarn-receptacle unit for containing all the yarns of all the machine sections, and means for humidifying the air in said unit including a humidifier device, disposed at the rear of the machine, passageway means of substantially T shape having its upright portion connected to the humidifier unit and its transverse arms extending oppositely along the machine to inlet ports for humid air to the receptacle at spaced points therealong, an outlet port from said passageway means to the room in which the machine is located, said port being disposed at the intersection of the said upright portion and said horizontal arms, and a valve operative in one position to close said last mentioned port and open both of said arms and in another position to open said last mentioned port and close both of said arms.

13. Means for humidifying a yarn receptacle and a room in which the receptacle is disposed, comprising a humidifier unit, a passageway element extending from the unit to the receptacle having a by-pass to the room, a gate for the by-pass, electro-responsive means for actuating the gate operative when energized to shut off vapor to the room, a humidostat in the receptacle for controlling the unit and the gate to supply humid air to the receptacle at all times required by the receptacle, and a humidostat in the room outside the receptacle for controlling the unit to supply humid air to the room when needed by the room and not needed by the receptacle.

14. The combination with knitting mechanism, and receptacle means associated with the mechanism for treating yarn to be fed directly from the receptacle means to the mechanism, of means for humidifying the spaces enclosed by the receptacle means and a room in which the mechanism is disposed, comprising mechanical humidifier means associated with the mechanism, passageway means for conducting humid air from the humidifier means to said spaces and to the room outside said receptacle means, and humidostat means for controlling the operation of the humidifier means in accordance with the humidity in said receptacle means and the humidity in said room to first bring up the humidity in said receptacle means to a desired degree and thereafter to bring up the humidity in said room to a desired degree without materially increasing the humidity within said receptacle.

15. The combination with knitting mechanism, and receptacle means associated with the mechanism for treating yarn to be fed directly from the receptacle means to the mechanism, of means for humidifying the spaces enclosed by the receptacle means and a room in which the mechanism is disposed, comprising mechanical humidifier means associated with the mechanism, passageway means for conducting humid air from the humidifier means to said spaces, valve gate means for said passageway means, and humidostat means for controlling the operation of the humidifier means and the valve gate means to selectively direct the flow of humid air to said spaces.

16. The combination with knitting mechanism, and receptacle means associated with the mechanism for treating yarn to be fed directly from the receptacle means to the mechanism, of means for humidifying the spaces enclosed by the receptacle means and a room in which the mechanism is disposed, comprising mechanical humidifier means associated with the mechanism, passageway means including branch passageway portions for conducting humid air from the humidifier means to said spaces, valve gate means providing for flow of humid air alternately through said branch passageway portions, and humidostat means for controlling the operation of the humidifier means and the valve gate means.

17. The combination with knitting mechanism, and receptacle means associated with the mechanism for treating yarn to be fed directly from the receptacle means to the mechanism, of means for humidifying the spaces enclosed by the receptacle means and a room in which the mechanism is disposed, comprising mechanical humidifier means associated with the mechanism, passageway means including branch passageway portions for conducting humid air from the humidifier means to said spaces, valve gate means providing for flow of humid air alternately through said branch passageway portions, and humidostat means for controlling the operation of the valve gate means.

18. The combination with knitting mechanism, and receptacle means associated with the mechanism for treating yarn to be fed directly from the receptacle means to the mechanism, of means for humidifying the spaces enclosed by the receptacle means and a room in which the mechanism is disposed, comprising mechanical humidifier means associated with the mechanism, passageway means including branch passageway portions for conducting humid air from the humidifier means to said spaces, valve gate means providing for flow of humid air alternately through said branch passageway portions, and humidostat means for controlling the operation of the humidifier and valve gate means.

19. The method of operating a textile machine having yarn packages in a yarn box and yarn manipulating implements outside said box comprising placing said machine in a room, discharging a stream of humidified air into the yarn box of said machine until the humidity reaches a desired point, and thereupon discharging said stream directly into said room and without adding materially to the degree of humidity in said box until the atmosphere in the room reaches a desired degree of humidity or until the humidity in said box falls below the said desired point.

20. The method of operating a textile machine having yarn packages in a yarn box and yarn manipulating implements outside said box comprising placing said machine in a room, discharging a stream of humidified air into the yarn box of said machine until the humidity reaches a desired point and thereupon diverting said stream from said box to said room to prevent any increase in humidity within said box and to increase the humidity in said room, and discharging said stream into said box again when necessary to maintain the humidity therein substantially at said point.

21. The method of operating a textile machine having yarn packages in a yarn box and yarn manipulating implements outside said box comprising placing said machine in a room, forming and discharging a stream of humidified air into the yarn box of said machine until the humidity reaches a desired point and thereupon diverting said stream from said box to said room to prevent the humidity in said box from rising above said point and to raise the humidity in said room toward a certain limit, directing said stream into said box again if the humidity in the box falls below said point before the humidity in said room reaches a certain limit, discontinuing the formation of said stream if the humidity in said room rises to said certain limit before the humidity in said box falls substantially below said desired point, and renewing the formation of said stream and directing it into either said box or said room as soon as the humidity in the box or room falls below said desired point or limit.

22. The method of operating a plurality of textile machines each having yarn packages in a yarn box and yarn manipulating implements outside said box comprising placing said machines in a room, forming streams of humidified air one for each of said machines, discharging said streams into said yarn boxes until the humidity in any given box reaches a desired point and thereupon, if the humidity of the room is below a certain limit, diverting the stream from said given box to said room to prevent the humidity in the given box from rising above said point and to raise the humidity in the room toward said limit, directing the stream into said given box again if the humidity in the box falls below said point before the humidity in said room reaches said limit, discontinuing the formation of the stream for said given box if the humidity in the room rises to said limit before the humidity in said given box falls substantially below said desired point, and renewing the formation of the stream for said given box and directing it into either said given box or said room as soon as the humidity in the box or room falls below said desired point or limit.

RICHARD F. ESHLEMAN.